(12) United States Patent
Disch

(10) Patent No.: US 12,543,920 B2
(45) Date of Patent: Feb. 10, 2026

(54) CONVEYOR WAREWASHER AND METHOD FOR OPERATING A CONVEYOR WAREWASHER

(71) Applicant: ILLINOIS TOOL WORKS INC., Glenview, IL (US)

(72) Inventor: Harald Disch, Elzach (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 18/250,183

(22) PCT Filed: Oct. 18, 2021

(86) PCT No.: PCT/US2021/055379
§ 371 (c)(1),
(2) Date: Apr. 21, 2023

(87) PCT Pub. No.: WO2022/093556
PCT Pub. Date: May 5, 2022

(65) Prior Publication Data
US 2023/0404360 A1 Dec. 21, 2023

(30) Foreign Application Priority Data
Oct. 28, 2020 (DE) ............ 10 2020 128 333.4

(51) Int. Cl.
*A47L 15/42* (2006.01)
*A47L 15/00* (2006.01)
(Continued)

(52) U.S. Cl.
CPC ....... *A47L 15/4295* (2013.01); *A47L 15/0026* (2013.01); *A47L 15/0028* (2013.01);
(Continued)

(58) Field of Classification Search
None
See application file for complete search history.

(56) References Cited

U.S. PATENT DOCUMENTS

| 2007/0181162 A1 | 8/2007 | Classen |
| 2011/0017240 A1 | 1/2011 | Berner et al. |
| 2017/0172371 A1 | 6/2017 | Engesser et al. |

FOREIGN PATENT DOCUMENTS

| CN | 111570315 A | 8/2020 |
| DE | 102008014318 A1 | 9/2009 |

(Continued)

OTHER PUBLICATIONS

International Searching Authority, International Search Report and Written Opinion issued in PCT/US2021/055379 mailed Jan. 26, 2022, 18 pages.

(Continued)

*Primary Examiner* — Rita P Adhlakha
(74) *Attorney, Agent, or Firm* — THOMPSON HINE LLP

(57) ABSTRACT

A conveyor warewasher for cleaning washware includes at least one washing zone at least one rinsing zone and a conveyor apparatus for conveying the washware therethrough. A camera system is arranged above or below or to the side of the conveyor apparatus and is configured to capture at least one image of an area of the conveyor apparatus. An evaluation device is configured to evaluate and determine on the basis of the classification performed whether, at the time of the image capture, at least one of the following categories of washware was present in the area of the conveyor apparatus: cutlery or pieces of cutlery; pots, pans, or GN containers; glasses, in particular drinking glasses; trays or tray-like objects; plates, cups, or bowls; utensils; other washware; mixed washware; plastic washware; or no washware.

13 Claims, 2 Drawing Sheets

(51) Int. Cl.
  *A47L 15/24* (2006.01)
  *A47L 15/46* (2006.01)
  *G06V 10/26* (2022.01)
  *G06V 10/44* (2022.01)
  *G06V 10/764* (2022.01)
  *G06V 20/50* (2022.01)

(52) U.S. Cl.
  CPC ......... *A47L 15/0034* (2013.01); *A47L 15/241* (2013.01); *A47L 15/4287* (2013.01); *A47L 15/4289* (2013.01); *A47L 15/46* (2013.01); *G06V 10/26* (2022.01); *G06V 10/44* (2022.01); *G06V 10/764* (2022.01); *G06V 20/50* (2022.01); *A47L 2401/04* (2013.01); *A47L 2501/04* (2013.01); *A47L 2501/06* (2013.01); *A47L 2501/07* (2013.01); *A47L 2501/12* (2013.01); *A47L 2501/20* (2013.01); *A47L 2501/24* (2013.01); *A47L 2501/30* (2013.01)

(56) References Cited

FOREIGN PATENT DOCUMENTS

| | | |
|---|---|---|
| DE | 102008057178 A1 | 5/2010 |
| DE | 102017126856 A1 | 5/2019 |
| EP | 1704809 A2 | 9/2006 |
| WO | WO-2011048575 A2 | 4/2011 |

OTHER PUBLICATIONS

International Searching Authority, International Preliminary Report on Patentability issued May 2, 2023, 11 pages.

CONVEYOR WAREWASHER AND METHOD FOR OPERATING A CONVEYOR WAREWASHER

TECHNICAL FIELD

The present invention relates generally to the field of industrial rinsing, and in particular to a conveyor warewasher, as well as to a method of operating such a conveyor warewasher.

Accordingly, the invention relates in particular to a belt conveyor warewasher or a rack conveyor warewasher.

BACKGROUND

Conveyor warewashers are used in the commercial sector. In contrast to domestic dishwashers, in which the washware to be cleaned remains stationary in the machine during cleaning, in conveyor warewashers the washware is conveyed through different treatment zones of the conveyor warewasher.

In the case of conveyor warewashers, the washware, for example dishes, pots, glasses, cutlery, and other utensils to be cleaned, are conveyed through a plurality of treatment zones, for example through at least one pre-washing zone, at least one main washing zone, at least one after-washing zone or pre-rinsing zone, at least one fresh water rinsing zone, and at least one drying zone. However, different types of washware require different treatment parameters for the individual process steps due to their application, their degree of soiling, their shape, and the material used. However, in today's conveyor warewashers, there is usually no automatic differentiation of the types of washware, so that the conventional systems are often designed as a compromise in order to be usable for several different types of washware.

A conveyor warewasher as defined in the preamble of claim 1 is already generally known from the prior art, at least in principle. For example, a rack conveyor warewasher is known from publication U.S. Pat. No. 6,530,996 B2, in which the washware to be cleaned is delivered to the respective treatment zones of the rack conveyor warewasher after being presorted in dish racks. In this conventional conveyor warewasher, sensors are provided that can be used in order to indirectly determine the type of washware to be cleaned, namely by detecting an identification feature attached to the rack. Depending on the detected identification feature, a suitable washing and/or rinsing program of the conveyor warewasher is selected.

A further conveyor warewasher is known from the publication DE 196 08 030C1, in which additional spray systems are switched on or off in the individual treatment zones of the conveyor warewasher in order to change the impact route in the treatment zones, depending upon the type and soiling of the washware to be cleaned.

It is known from the publication DE 10 2005 021 101A1 to switch additional spray nozzles on and off in a conveyor warewasher in order to thus reduce the consumption of rinsing water, depending upon the conveyance speed of the washware in the rinsing zone of the conveyor warewasher. Sensors are provided, which sense the presence of the washware at the entrance of the conveyor warewasher, wherein the system automatically reduces the conveyance speed when the amount of the washware entering the conveyor warewasher decreases.

However, the currently known systems for the automatic detection of types of washware have various disadvantages in their implementation.

For example, conventional systems have only been configured in order to detect glasses and cutlery when these types of washware are stored in specially coded glass or cutlery racks. For this purpose, the racks are encoded with magnets and are then detected by a magnetic sensor.

The disadvantage to this approach is that specially coded rinsing racks are necessary for this purpose, and if they are not used by the operator of the warewasher, detection is not possible.

Heavily soiled washware, such as pots, baking trays, or GN containers, are typically made of metal. In the conventional approaches, these are detected by an inductive sensor at the machine inlet.

The disadvantage here, however, is that the maximum possible switching distance is limited with this type of sensors, and it is thus only possible to detect the washware that is positioned at the very edge of the conveyor belt. A correct function is thus also only ensured here when the cleaning staff have previously been trained accordingly.

It must thus be noted that no defect-free operation and in particular no defect-free detection is ensured in the systems currently known for the detection of washware. In addition, several sensors are required in order to detect different types of washware, making the entire system relatively complex and expensive.

SUMMARY

The present invention solves the problem of providing a conveyor warewasher having at least one washing zone and at least one rinsing zone, which, despite the reduction of the consumption of resources (fresh water, chemicals, and energy), can provide good treatment results in operation for all types of washware.

In particular, it is intended to simplify the detection of the washware on the conveyor warewasher, wherein the susceptibility to errors in the washware detection is simultaneously reduced, and wherein in particular no special measures must be carried out on the part of the cleaning staff in order to ensure the detection of the washware. Furthermore, a corresponding method of operating such a conveyor warewasher is to be specified.

With respect to the conveyor warewasher, the underlying problem of the invention is achieved by the subject matter of patent claim 1, wherein advantageous further developments of the conveyor warewasher according to the invention are specified in the respectively dependent claims.

Accordingly, the present invention relates in particular to a conveyor warewasher of the above-mentioned type, wherein the conveyor warewasher has a camera system as a washware detector device, which is arranged above or below or to the side of the conveyor apparatus of the conveyor warewasher. This camera system is configured in order to capture at least one image of an area of the conveyor apparatus, preferably continuously or at predetermined or determinable times and/or events.

A corresponding image processing device is associated with the camera system, said device being configured in order to in particular pre-process the at least one image captured by the camera system, segment the particularly optionally pre-processed image, extract features of objects contained in the image, and classify the objects.

According to the present invention, there is further provided an evaluation device, which is configured in order to evaluate the classification carried out and determine whether, at the time of the image capture, at least one of the following categories of washware was present in the area of the conveyor apparatus:

cutlery or pieces of cutlery;
pots, pans, or GN containers;
glasses, in particular drinking glasses;
trays or tray-like objects;
plates, cups, or bowls;
utensils;
other washware;
mixed washware;
plastic washware; or
no washware.

The advantages achievable with the solution according to the invention are obvious: the camera system as a washware detector device enables an automatic detection of washware by means of camera-based image processing. In particular, all relevant categories of washware can be detected using the same detector system, without having to use different sensors or coded washware racks. By automatically recording the categories of washware to be treated, it is possible to automatically select an optimal treatment program for each category of washware that is detected in the conveyor warewasher in at least one of the treatment zones and to set the process parameters associated with the selected treatment program. The consumption of fresh water, chemicals, and energy can be reduced via the optimal adjustment of the process parameters of the respective treatment zones, which can be achieved in this way.

With the camera system, it is possible to capture different categories of washware (for example, glasses, cutlery, GN containers, etc.). Thus, the operator of the conveyor warewasher no longer needs to manually select the program. Preferably, the conveyor warewasher automatically selects the appropriate program with the corresponding parameters in order to optimize washing, rinsing, and drying results. As a final result, the operator of the conveyor warewasher machine has no or fewer second runs to handle that would have been caused by the selection of the wrong treatment program.

No, or at least significantly reduced, training of cleaning staff is necessary for the appropriate selection of a program cycle. In addition, fewer rejections occur due to the automatically selected program cycle, and the effort required to pre-treat and after-treat the washware is significantly reduced.

According to the present invention, an image processing device is used for image processing, said device being configured in order to in particular optionally pre-process the image captured by the camera system and to segment the particularly optionally pre-processed image. In segmentation, substantively contiguous regions are generated by aggregating adjacent pixels or voxels according to a certain homogeneity criterion.

According to advantageous realizations of the solution according to the invention, the image processing device is configured in order to segment the particularly optionally pre-processed image according to a model-based method, wherein the model-based method assumes a pre-determined, and in particular machine-learnable, certain shape of the objects contained in the image.

This further development is particularly advantageous, because only a relatively small number of different pieces of washware are used in commercial rinsing. The invention is based on the finding that in commercial kitchens, it is usually necessary to clean gastronomical washware having uniform sizes and shapes. This circumstance predestines a model-based method for segmenting the images to be processed.

The model-based method is based upon a model of the objects sought. This may relate, for example, to shape, size, and/or dimension. In this context, it is particularly appropriate that machine-learning can be used in order to train the image processing device on the washware to be rinsed.

Of course, other methods are also used, such as a pixel-oriented method, an edge-oriented method, a region-oriented method, and/or a texture-oriented method, in order to extract features of the objects contained in the image with respect to shape, size, location, orientation, and/or material.

In the pixel-oriented method, a decision is made for each individual pixel point as to whether or not it belongs to a particular segment. In an edge-oriented method, edges or object transitions are searched in the image. In a region-oriented method, the number of points is considered in its entirety and it is attempted to find contiguous objects.

The texture-oriented method exploits the fact that some image objects do not have a uniform color, but rather a uniform texture. For example, an object (piece of washware) may have grooves that then appear in the captured image as alternating stripes of dark and light color.

According to the realizations of the conveyor apparatus according to the invention, the evaluation device is further configured in order to determine the amount of washware present in the area of the conveyor apparatus at the time of the image capture and/or a number of pieces of washware present in the area of the conveyor apparatus at the time of the image capture.

Alternatively or additionally, the evaluation device can be configured in order to determine a number of pieces of washware that were present in the area of the conveyor apparatus at the time of the image capture and/or an amount of the washware that was present in the area of the conveyor apparatus at the time of the image capture based on the classification determined for each category of washware.

As a further alternative or supplementation, the evaluation device can be configured in order to determine a preferably average degree of soiling of the washware that was present in the area of the conveyor apparatus at the time of the image capture and/or a preferably average degree of soiling of the pieces of washware that were present in the area of the conveyor apparatus at the time of the image capture.

These aforementioned aspects extend the functionality of the inventive washware detector device, which is designed as a camera system. In other words, the washware detector system is not only able to determine which categories of washware are to be treated (cleaned) by the conveyor warewasher, but also to carry out a weighting if there are different categories of washware contained in the detection range of the camera system, i.e. in the area of the conveyor apparatus monitored by the camera system. In addition, it allows the washware detector system to make a determination about the degree of soiling of the pieces of washware to be cleaned in order to accordingly adjust the treatment parameters in at least one of the treatment zones of the conveyor warewasher.

Particularly preferably, it is provided that the conveyor warewasher further has a control device, which is configured in order to select a pre-determined or determinable treatment program automatically for each determined category of washware and/or depending upon a determined number or amount of pieces of washware per determined category of washware and/or depending upon the determined preferably average degree of soiling of the washware and/or the pieces of washware, according to which program the washware is to be treated in the at least one washing zone and/or in the at least one rinsing zone, and to set the process parameters associated with the selected treatment program, preferably time-delayed and particularly preferably time-delayed depending upon a conveyance speed of the conveyor apparatus.

Alternatively or additionally, the control device is configured in order to automatically set a predetermined or determinable conveyance speed, preferably time-delayed, of the conveyor apparatus for each determined category of washware and/or depending upon a determined number or an amount of pieces of washware for each determined category of washware and/or depending upon the determined preferably average degree of soiling of the washware and/or the pieces of washware.

In this way, an optimally adjusted treatment program can be automatically set in an economical way for each selected category of washware. The invention is based on the finding that the process parameters to be selected for an effective treatment or cleaning for the individual treatment zones depend upon the type of the washware to be treated, the amount of the washware to be treated, and/or the degree of soiling of the washware to be treated.

The different categories of washware require suitable treatment programs according to which the washware is to be treated, for example in the washing zones (pre-washing, main washing, after-washing zones) of the conveyor warewasher. The treatment programs are particularly coordinated in view of a volumetric flow of washing liquid to be sprayed per unit of time in at least one of the washing zones and in view of a nozzle pressure with which the washing liquid is sprayed in at least one of the washing zones.

For example, lightly soiled dishes, such as trays or drinking glasses—as opposed to heavily soiled washware with embedded and difficult-to-remove food residues, such as cooking utensils, chafing dishes, oven tins, etc.—require only a relatively small volume of washing liquid sprayed per unit of time in the washing zone and only a relatively low nozzle pressure for spraying of the washing liquid in the washing zone.

On the other hand, the different categories of washware also require treatment programs that are coordinated to the volumetric flow of rinsing liquid to be sprayed in the at least one rinsing zone per unit of time, according to which programs the washware is treated in the rinsing zone of the conveyor warewasher.

With the solution according to the invention, it is possible to optimally adjust the rinsing mechanism of at least one washing zone, i.e. the volumetric flow of washing liquid to be sprayed per unit of time in the washing zone and the nozzle pressure with which the washing liquid is sprayed in the washing zone, to the category of washware to be treated in the washing zone.

Alternatively or additionally, with the solution according to the invention, it is furthermore possible to optimally adjust, for example, the volumetric flow of rinsing liquid to be sprayed per unit of time in the rinsing zone to the category of washware to be treated in the rinsing zone. The same also applies to the type and amount of a rinsing agent chemical to be added to the rinsing liquid, if necessary.

Thus, in a simple but effective manner an "overwashing," for example, of only lightly soiled washware can be prevented, so that during the cleaning process, resources of energy, water, chemicals, etc. are used no longer than is necessary for such only lightly soiled washware.

Thus, the consumption of fresh water, which for example is sprayed in pure form in the rinsing zone or mixed with further additives before being sprayed on the washware, can be reduced. The reduced fresh water consumption of the conveyor warewasher can also reduce the consumption of chemicals, in particular rinsing agents and/or cleaning agents, without a change in the chemical concentration of the respective liquid. By supplying less fresh water, the amount of water to be heated is lower, which can also conserve energy.

In a particularly preferred further development of the conveyor warewasher according to the invention, it is provided that the image processing device is configured in order to detect washware-free portions in the area of the conveyor apparatus that extend in the direction of conveyance of the conveyor apparatus. In further developments of this aspect, it can be provided that the control device of the conveyor warewasher is configured in order to change the process parameters of the at least one washing zone and/or the at least one rinsing zone when at least one washware-free portion is determined, automatically and preferably time-delayed, preferably time-delayed depending upon a conveyance speed of the conveyor apparatus.

Alternatively or additionally, the control device can be configured in order to automatically change the conveyance speed of the conveyor apparatus when at least one washware-free portion is determined.

In this context, in particular, the process parameters are to be adjusted in such a way that ensures operation of the conveyor warewasher in a manner that conserves resources as much as possible when at least one of the washware-free portion is determined.

According to realizations of the conveyor warewasher, the control device is configured in order to:

automatically, and depending upon the determined category of washware, select a pre-determined or determinable value of a volumetric flow of the washing liquid to be sprayed per unit of time in the at least one washing zone and set the volumetric flow of the washing liquid to be sprayed per unit of time to the selected value; and/or automatically, and depending upon the determined category of washware, select a predetermined or determinable value of a nozzle pressure with which the washing liquid is sprayed in the at least one washing zone and set the nozzle pressure to the selected value; and/or automatically, and depending upon the determined category of washware, select a predetermined or determinable value of a volumetric flow of rinsing liquid to be sprayed per unit of time in the at least one rinsing zone and set the volumetric flow of rinsing liquid sprayed per unit of time to the selected value; and/or select a predetermined or determinable value of a temperature of the rinsing liquid to be sprayed in the at least one rinsing zone and set the temperature of the rinsing liquid sprayed in the at least one rinsing zone to the selected value; and/or automatically, and depending upon the determined category of washware, set a predetermined or determinable value of an amount of rinse aid sprayed per unit of time in the at least one rinsing zone to a selected value; and/or automatically, and depending upon the determined category of washware, adjust a pre-determined or determinable value of an amount of detergent sprayed per unit of time in the at least one washing zone or in an additional intermediate zone to a selected value; and/or automatically, and depending upon the determined category of washware, select a predetermined or determinable value of a volumetric flow/nozzle pressure of drying air to be sprayed per unit of time in the at least one drying zone and set the volumetric flow/nozzle pressure of drying air sprayed per unit of time to the selected value; and/or automatically, and depending upon the determined category of washware, switch between different chemical products, in particular between a universal rinsing agent for plates, cups, bowls, cutlery, glasses, etc. and a special rinsing agent for plastic washware, such as in particular trays or other plastic washware.

With regard to the image processing device, in the realizations of the conveyor warewasher according to the invention, it is provided that the image processing device is configured in order to extract a position, location, and/or orientation of the objects in the area of the conveyor apparatus as a feature of the objects contained in the image. The image processing device is preferably further configured in order to classify the extracted position, location, and/or orientation of the objects in the area of the conveyor apparatus.

In order to realize this aspect, it is particularly advantageous that the conveyor apparatus has a conveyor belt or a dish rack with receiving compartments defined particularly by finger elements for receiving washware. With the aid of the camera system or the image processing device, these defined receiving compartments make it possible to optimally determine a position, location, and/or orientation of the objects in the area of the conveyor apparatus and to carry out a corresponding classification based on this information.

Of course, other solutions for the conveyor apparatus are possible here, as well.

The area of the conveyor apparatus monitored by the camera system, continuously or at predetermined or at determinable times and/or events, should preferably be positioned upstream of the at least one washing zone and preferably within an inlet tunnel of the conveyor warewasher, when viewed in the direction of conveyance of the conveyor apparatus.

In other words, the camera system is preferably located within a lateral and upwardly closed inlet tunnel of the conveyor warewasher. In this way, it is ensured that predeterminable, defined conditions can be present in the image capture.

In a further development of the camera system, it is provided that a lighting device, which is in particular synchronized with the image capture of the camera system, is associated with the camera system for preferably defined illumination or lighting of the area of the conveyor apparatus.

Preferably, the lighting device has at least one light source, which is configured in order to enable homogeneous and preferably diffuse lighting or illumination of at least one area of the area of the conveyor apparatus with light at a color temperature in the main part of between 5,200 and 5,700 Kelvins.

Mounting the camera system with the lighting device that is preferably associated with the camera system within the inlet tunnel of the conveyor warewasher has decisive advantages compared to a camera position outside of the inlet tunnel. While external mounting would be ideal for protecting the camera system, when the camera system is mounted externally, it is relatively effort-intensive to find the right moment to capture images. Another disadvantage is the increased effort involved in training the service personnel and the increasing time required for the start-up of the warewasher.

Conversely, when the camera system is positioned within the inlet tunnel of the conveyor warewasher, the moment of image capture can be defined relatively simply. Additionally, the start-up of the warewasher on site is not affected. The camera system can already be fully assembled at the factory, wherein no increase in the training for the service personnel is required and the operator of the warewasher does not need to perform a lengthy start-up. A further major advantage is the independence of the ambient lighting when assembling the camera system within the inlet tunnel of the conveyor warewasher. The lighting may be designed such that there are always fixedly defined ambient conditions.

The invention further relates to a method of operating a conveyor warewasher, in particular a conveyor warewasher of the aforementioned type according to the invention.

In particular, the method comprises the following method steps:

in an inlet area of the conveyor warewasher and in particular within an inlet tunnel of the conveyor warewasher, at least one image of an area of a conveyor apparatus of the conveyor warewasher is preferably captured from above or below or from the side;

the at least one image is optionally pre-processed and the optionally pre-processed image is segmented using an image processing device in order to extract features of objects contained in the image and to classify the objects; and based on the classification carried out, it is determined using an evaluation device whether, at the time of the image capture, at least one of the following categories of washware was present in the area of the conveyor apparatus:

cutlery or pieces of cutlery;
pots, pans, or GN containers;
glasses, in particular drinking glasses;
trays or tray-like objects;
plates, cups, or bowls;
utensils;
other washware;
mixed washware;
plastic washware; or
no washware.

Preferably, in the method according to the invention, it is provided that the amount of washware present in the area of the conveyor apparatus at the time of the image capture and/or a number of pieces of washware present in the area of the conveyor apparatus at the time of the image capture is also determined.

Alternatively or additionally, a number of pieces of washware that were present in the area of the conveyor apparatus at the time of the image capture and/or an amount of washware that was present in the area of the conveyor apparatus at the time of the image capture are determined for each of the specified categories of washware.

Alternatively or additionally, a preferably average degree of soiling of the washware present in the area of the conveyor apparatus at the time of the image capture and/or a preferably average degree of soiling of the pieces of washware present in the area of the conveyor apparatus at the time of the image capture are determined.

According to realizations of the method according to the invention, it is provided that a pre-determined or determinable treatment program is selected and/or set automatically for each determined category of washware and/or depending upon a determined number or amount of pieces of washware per determined category of washware and/or depending upon a determined preferably average degree of soiling of the washware and/or the pieces of washware, according to which program the washware is to be treated in the at least one washing zone and/or in the at least one rinsing zone, and a predetermined or determinable conveyance speed of the conveyor apparatus is set for each determined category of washware and/or depending upon a determined number or amount of pieces of washware per determined category of washware and/or depending upon a determined preferably average degree of soiling of the washware and/or the pieces of washware.

BRIEF DESCRIPTION OF THE DRAWINGS

In the following, an example of the invention will be described in reference to the drawings using preferred embodiments.

The following are shown in drawings:

FIG. 1 shows a conveyor warewasher 1 with a conveyor apparatus 2 for conveying washware not shown in the drawings through the conveyor warewasher 1 in a direction of conveyance 3.

DETAILED DESCRIPTION

Figure 1:
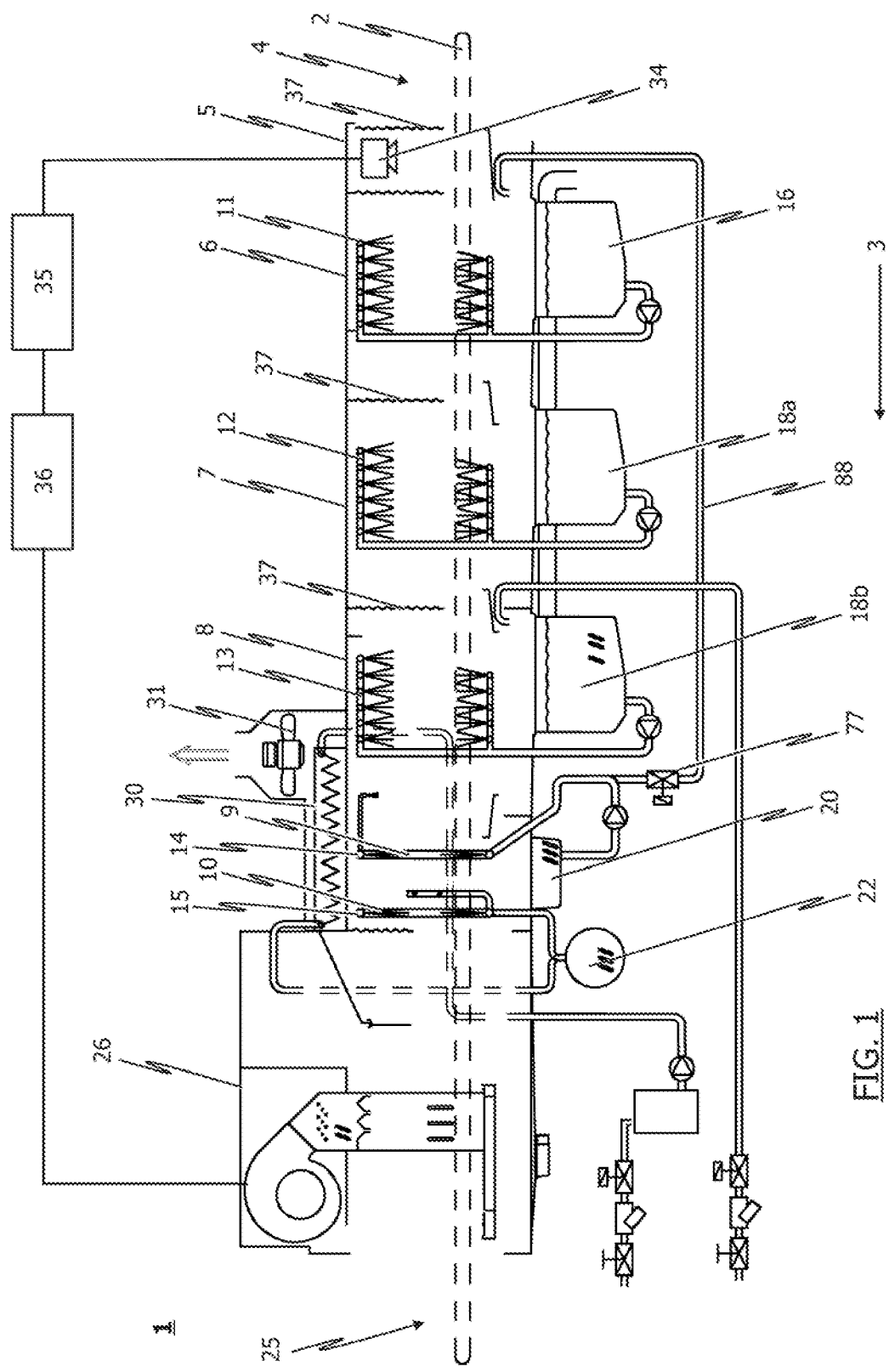
FIG. 1 a schematic longitudinal sectional view of a conveyor warewasher according to a first embodiment of the invention.

The conveyor apparatus 2 can be, for example, a conveyor belt, which is preferably configured as a multi-member plastic conveyor belt and is continuously driven by an electric drive not shown in FIG. 1, so that the washware placed upon the conveyor belt 2 is conveyed through the various treatment zones 6, 7, 8, 9, 10, and 26 of the conveyor warewasher 1 according to the illustration in FIG. 1.

Typically, the washware conveyed in the direction of conveyance 3 is placed upon the conveyor apparatus or conveyor belt 2 in the area of the inlet 4. According to the direction of conveyance 3 indicated by the arrow, the washware is then conveyed from the inlet 4 into an inlet tunnel 5.

The conveyor warewasher 1 according to the first embodiment of the present invention has at least one washing zone, for example as shown in FIG. 1, a pre-washing zone 6, as well as a first main washing zone 7 and a second main washing zone 8, which are arranged downstream of the pre-washing zone 6 when viewed in the direction of conveyance 3.

In the conveyor warewasher 1 shown in FIG. 1, an after-washing zone 9 and a rinsing zone 10 downstream of the after-washing zone 9 are arranged downstream of the at least one washing zone 6, 7, 8 when viewed in the direction of conveyance 3.

In the illustration according to FIG. 1, the conveyor apparatus 2 is shown as a circumferential conveyor belt. However, conveyor racks in which the not explicitly shown washware is inserted and which are placed on the top of the conveyor belt are also conceivable as the conveyor apparatus 2.

When viewed in the direction of conveyance 3, the washware received either directly on the conveyor belt 2 or held by racks runs in the direction of conveyance 3 through the inlet tunnel 5, the subsequent pre-washing zone 6, the first main washing zone 7, the second main washing zone 8, the after-washing zone 9, the rinsing zone 10, a drying zone 26, and into an outlet path 25.

Spray nozzles 11, 12, 13, 14 and 15 are respectively associated with the aforementioned treatment zones 6, 7, 8, 9 and 10 of the conveyor warewasher 1, via which nozzles liquid is sprayed onto the washware conveyed by the conveyor apparatus 2 through the respective treatment zones 6, 7, 8, 9, and 10. Each treatment zone 6, 7, 8, 9 and 10 is associated with a tank 16, 18, 20, and 22 in which sprayed liquid is received and/or in which liquid is provided for the spray nozzles of the respective zones. In the conveyor warewasher 1 shown in FIG. 1, rinsing liquid is sprayed onto the washware, not shown in the illustrations, in the form of fresh water, which may be pure or mixed with further additives such as rinsing agents, via the spray nozzles 15 of the rinsing zone 10 arranged above and below or to the side of the conveyor belt.

A portion of the sprayed rinsing liquid is conveyed from zone to zone in a cascading system counter to the direction of conveyance 3 of the washware. The remaining portion is guided directly into the pre-wash tank 16 via a valve 77 and a bypass line 88.

The sprayed rinsing liquid is collected in the tank 20 (after-wash tank 20) of the after-washing zone 9, from which it is conveyed via a pump system to the spray nozzles 14 (after-wash nozzles 14) of the after-washing zone 9. In the after-washing zone 9, washing liquid is rinsed from the washware. The liquid resulting from this flows into the wash tank 18b of the second main washing zone 8, is usually provided with a cleaning agent and then sprayed onto the washware by a pumping system via the nozzles 13 (wash nozzles 13) of the second main washing zone 8.

Liquid flows from the wash tank 18b of the second main washing zone 8 into the wash tank 18a of the first main washing zone 7. From there, the liquid is again sprayed onto the washware by a further pump system via the wash nozzles 12 of the first main washing zone 7. From the wash tank 18a of the first main washing zone 7, the liquid then flows into the pre-wash tank 16 of the pre-washing zone 6. Liquid in the pre-wash tank 16 is sprayed onto the washware by a pumping system via the pre-wash nozzles 11 of the pre-washing zone 6 in order to remove coarse impurities from the washware.

The individual rinsing systems of the treatment zones 6, 7, 8, 9, and 10 ensure that the washware is sprayed from both the top and the bottom.

The respective zones 6, 7, 8, 9, and 10 of the conveyor warewasher 1 can be separated from one another via separating curtains 37. In the embodiment shown in FIG. 1, the inlet tunnel 5 itself is also separated from the inlet 4 via a separating curtain 37. The provision of separating curtains 37 can prevent washing liquid and rinsing liquid from splashing out and steam from escaping from the conveyor warewasher.

The aforementioned drying zone 26 follows the rinsing zone 10 in the direction of conveyance 3 of the washware. In the drying zone 26, the washware is dried with dry and heated air in order to blow off or dry the moisture that is present on the washware. In order to maintain the moisture content of the air in a range that is favorable for drying, it is conceivable, for example, to supply room air via an opening, for example through the exit opening for the washware. The warm and moistened air is extracted from the drying zone 26, for example, by means of a fan 31 via a further opening.

It is advantageous for the exhaust air from the drying zone 26 to pass through a device for heat recovery 30, in which a condenser can be provided. The heat recovery device 30 serves to recover at least a portion of the heat energy contained in the exhaust air.

In today's belt/rack conveyor warewashers, the washware is conveyed through a plurality of treatment zones, such as pre-washing zones, main washing zones, after-washing zones, rinsing zones, and drying zones.

As already indicated, different types of washware in the treatment zones of the conveyor warewasher require different treatment parameters. However, with the currently known conveyor warewashers, there is no automatic differentiation of the types of washware to be treated, so that the conventional systems are typically designed as a compromise, such that they are more or less efficient for multiple types of washware. This approach leads to the fact that significantly more resources (energy, water, chemicals, etc.) are generally used in order to treat the washware than would actually be necessary.

The conveyor warewasher 1 according to the invention, as shown for example in FIG. 1, is characterized in that the conveyor warewasher 1 has a camera system 34, which is disposed above the conveyor apparatus 2 and is configured in order to take at least one image of an area of the conveyor apparatus 2, preferably continuously or at predetermined or determinable times and/or events.

The camera system 34 is associated with an image processing device 35, which is configured in order to, in particular, optionally pre-process the at least one image captured by the camera system 34, to segment the particularly optionally pre-processed image, to extract features, and to classify objects contained in the image (washware).

Further, an evaluation device is provided, which is configured in order to perform an evaluation on the basis of the classification carried out and to determine whether, at the time of the image capture, at least one of the following categories of washware was present in the area of the conveyor warewasher 1:
  cutlery or pieces of cutlery;
  pots, pans, or GN containers;
  glasses, in particular drinking glasses;
  trays or tray-like objects;
  plates, cups, or bowls;
  utensils;
  other washware;
  mixed washware;
  plastic washware; or
  no washware.

As indicated in FIG. 1, the camera system 34 is preferably located within the inlet tunnel 5 of the conveyor warewasher 1.

The conveyor warewasher 1 further has a control device 36, schematically shown in FIG. 1. The control device 36 is configured in order to control various controllable components of the conveyor warewasher 1, such as the respective pumps and valves, in accordance with a predetermined or determinable program sequence and thus be able to set suitable process parameters in the individual treatment zones of the conveyor warewasher 1.

As shown in the drawings, the control device 36 is in particular connected to the camera system 34 or the image processing/evaluation device 35 via a suitable communication connection in order to query the category of the washware supplied to the conveyor warewasher 1 as determined by the evaluation device continuously or at predetermined times/events.

The term "washware category" as used herein is a summary of the different types of washware into categories, which together form a classification and/or category of washware. The types of a category of washware have in common that they are optimally treatable according to the same or similar treatment parameters.

Figure 2:
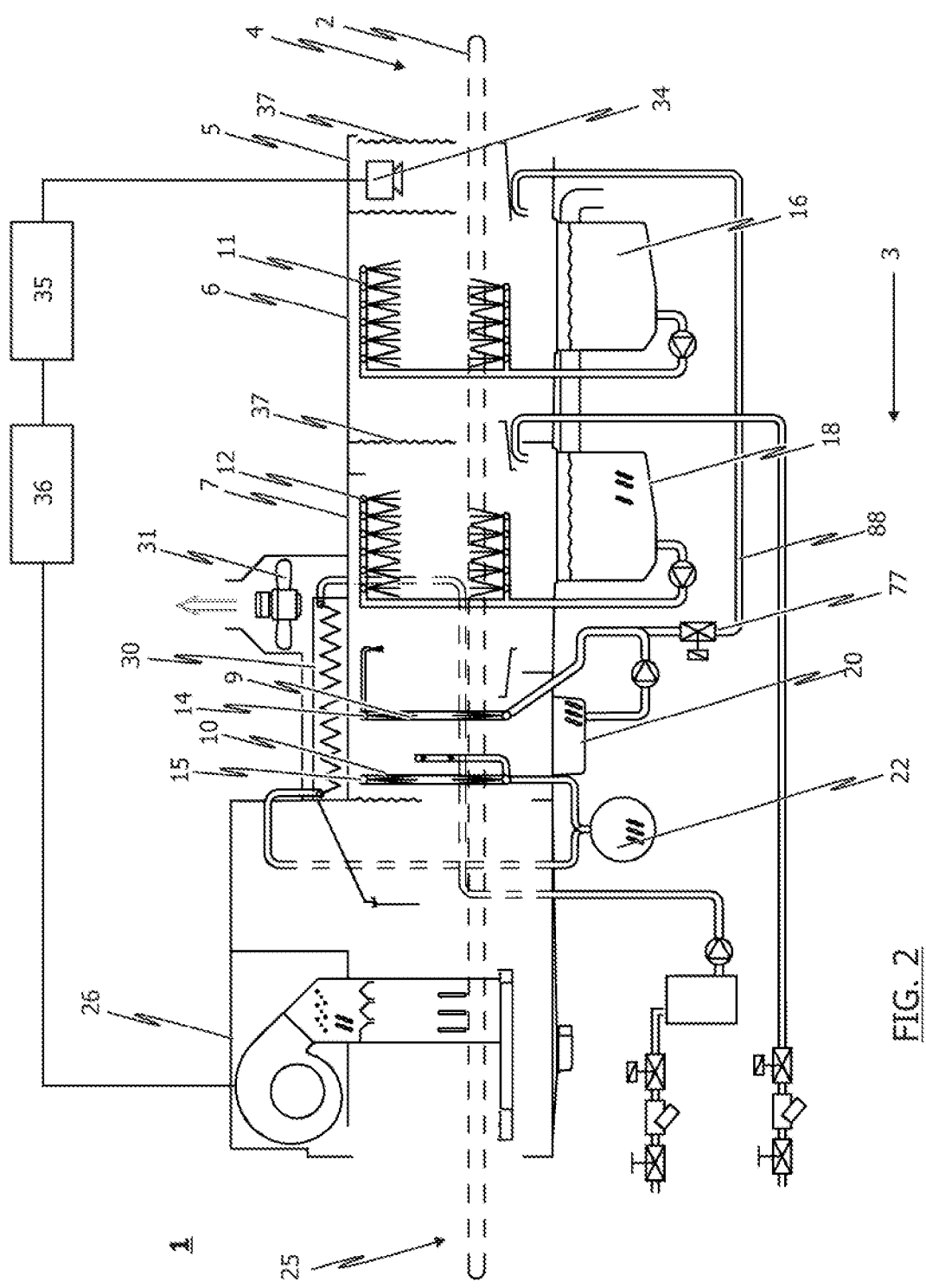
FIG. 2 a schematic longitudinal sectional view of a conveyor warewasher according to a second embodiment of the invention.

In FIG. 2, a schematic side view shows a second embodiment of the conveyor warewasher 1 according to the invention. The conveyor warewasher 1 according to FIG. 2 differs from the embodiment previously described with reference to FIG. 1 in that, in the second embodiment, only one main washing zone is provided. The remaining structure of the conveyor warewasher 1 according to FIG. 2 is identical to the structure of the conveyor warewasher 1 shown in FIG. 1, so that reference can be made to the description of FIG. 1 in this regard.

The invention is [not] limited to the embodiments of FIG. 1 and FIG. 2 shown by way of example in the drawings. Rather, the invention arises from an overall consideration of the claims and the description of the exemplary embodiments by a person skilled in the art.

In particular, it is conceivable, for example, that the conveyor warewasher 1 according to the present invention further has a steam soaking zone, not explicitly shown in the drawings, wherein the control device 36 may be configured in order to automatically make an adjustment for each category of washware to the effect that the supply of steam to the steam soaking zone is switched on or off.

It is also generally conceivable that the conveyor warewasher 1 according to the invention has a cleaning agent direct spray system, wherein the control device 36 is configured in order to automatically make an adjustment for each category of washware to the effect that the supply of cleaning agents to the cleaning agent direct spray system is switched on or off depending upon the category of washware.

However, it is conceivable that the control device 36 is configured in order to automatically select a pre-determined or determinable treatment program for each category of washware, according to which program the washware assigned to the category of washware is to be treated in the drying zone 26, and to set the process parameters associated with the selected treatment program.

In principle, it is preferred for the control device 36 to select the optimal process parameters for the treatment of the respective types of washware, optionally automatically, and to set them accordingly in order to fundamentally provide the user of the conveyor warewasher 1 with the option of being able to manually adjust or change the process parameters applicable for the respective treatment zones.

The invention claimed is:

1. A conveyor warewasher for cleaning washware, wherein the conveyor warewasher has at least one washing zone and at least one rinsing zone as well as a conveyor apparatus for conveying the washware through the at least one washing zone and the at least one rinsing zone,
    wherein the conveyor warewasher has a camera system, which is arranged above or below or to the side of the conveyor apparatus and is configured in order to capture at least one image of an area of the conveyor apparatus continuously or at predetermined or determinable times and/or events, wherein an image processing device is connected to receive the at least one image captured by the camera system, said image processing device being configured to pre-process the at least one image captured by the camera system, segment the pre-processed image, and extract and classify features of objects contained in the image, wherein the image processing device is further configured in order to evaluate and determine on the basis of the classification performed, which of the following categories of washware were present in the area of the conveyor apparatus at the time of image capture:

cutlery or pieces of cutlery;
pots, pans, or GN containers;
drinking glasses;
trays or tray-like objects;
plates, cups, or bowls;
utensils;
other washware;
mixed washware; or
plastic washware;

wherein the image processing device is further configured to determine a number of pieces of washware that were present in the area of the conveyor apparatus at the time of the image capture for each category of washware determined to be present;

wherein the conveyor warewasher further comprises a control device connected with the image processing device by a communication connection, wherein the control device is configured such that, when multiple categories of washware are determined to be present, the control device will select a pre-determined or determinable treatment program automatically depending upon the determined number of pieces of washware in each one of the multiple categories of washware determined to be present, according to which selected treatment program the washware is to be treated in the at least one washing zone and/or in the at least one rinsing zone.

2. The conveyor apparatus according to claim 1, wherein the image processing device is further configured in order to determine a degree of soiling of the washware that was present in the area of the conveyor apparatus at the time of the image capture and/or a degree of soiling of the pieces of washware that were present in the area of the conveyor apparatus at the time of the image capture.

3. The conveyor warewasher according to claim 2, wherein the control device is configured in order to select the pre-determined or determinable treatment program automatically based upon both the determined number of pieces of washware per category of washware determined to be present and the determined degree of soiling.

4. The conveyor warewasher according to claim 1, wherein the image processing device is further configured in order to detect washware-free portions in the area of the conveyor apparatus that extend in the direction of conveyance of the conveyor apparatus.

5. The conveyor warewasher according to claim 4, wherein the control device is configured in order to change the process parameters of the at least one washing zone and/or the at least one rinsing zone, and/or a conveyance speed of the conveyor apparatus, when at least one washware-free portion is determined, automatically and time-delayed depending upon a conveyance speed of the conveyor apparatus.

6. The conveyor warewasher according to claim 1, wherein the image processing device is configured in order to extract a position, location, and/or orientation of the objects in the area of the conveyor apparatus as a feature of the objects contained in the image, and wherein the image processing device is further configured in order to classify the extracted position, location, and/or orientation of the objects in the area of the conveyor apparatus.

7. The conveyor warewasher according to claim 1, wherein the conveyor apparatus has a conveyor belt or a dish rack with receiving compartments defined by finger elements for receiving washware.

8. The conveyor warewasher according to claim 1, wherein the area of the conveyor apparatus monitored by the camera system, continuously or at predetermined or at determinable times and/or events, is positioned upstream of the at least one washing zone and within an inlet tunnel of the conveyor warewasher, when viewed in the direction of conveyance of the conveyor apparatus.

9. The conveyor warewasher according to claim 1, wherein a lighting device, which is synchronized with the image capture of the camera system, is associated with the camera system for defined illumination or lighting of the area of the conveyor apparatus.

10. The conveyor warewasher according to claim 9, wherein the lighting device has at least one light source, which is configured in order to enable homogeneous and diffuse lighting or illumination of at least one area of the area of the conveyor apparatus with light at a color temperature in the main part of between 5,200 and 5,700 Kelvins.

11. The conveyor warewasher according to claim 1, wherein the image processing device is configured in order to segment the pre-processed image according to a model-based method, wherein the model-based method assumes a pre-determined, and machine-learnable, certain shape of the objects contained in the image.

12. The conveyor warewasher according to claim 1, wherein the image processing device is configured in order to segment the pre-processed image according to a pixel-oriented method, according to an edge-oriented method, according to a region-oriented method, and/or according to a texture-oriented method in order to extract features of the objects contained in the image with respect to shape, size, location, orientation, and/or material.

13. A conveyor warewasher for cleaning washware, wherein the conveyor warewasher has at least one washing zone and at least one rinsing zone and a conveyor apparatus for conveying washware through the at least one washing zone and the at least one rinsing zone, wherein the conveyor warewasher has a camera system, which is positioned and configured in order capture at least one image of an area of the conveyor apparatus, wherein a image processing device is connected to receive the at least one image captured by the camera system, said image processing device being configured to pre-process the at least one image captured by the camera system, segment the pre-processed image, and extract and classify features of objects contained in the image, wherein the image processing device is further configured to evaluate and determine on the basis of the classification performed which of a plurality of categories of washware were present in the area of the conveyor apparatus at the time of image capture;

wherein the image processing device is further configured to determine a number of pieces of washware that were present in the area of the conveyor apparatus at the time of the image capture for each category of washware determined to be present;

wherein the conveyor warewasher further comprises a control device connected with the image processing device by a communication connection, wherein the control device is configured such that, when multiple categories of washware are determined to be present, the control device will select a pre-determined or determinable treatment program automatically depending at least in part upon the determined number of pieces of washware in each one of the multiple categories of washware determined to be present, according to which selected treatment program washware is to be treated in the at least one washing zone and/or in the at least one rinsing zone and/or the at least one drying zone.

\* \* \* \* \*